July 21, 1925.
F. BLEDIG
1,546,366
MEAT LOAF PAN FILLER
Filed May 17, 1924
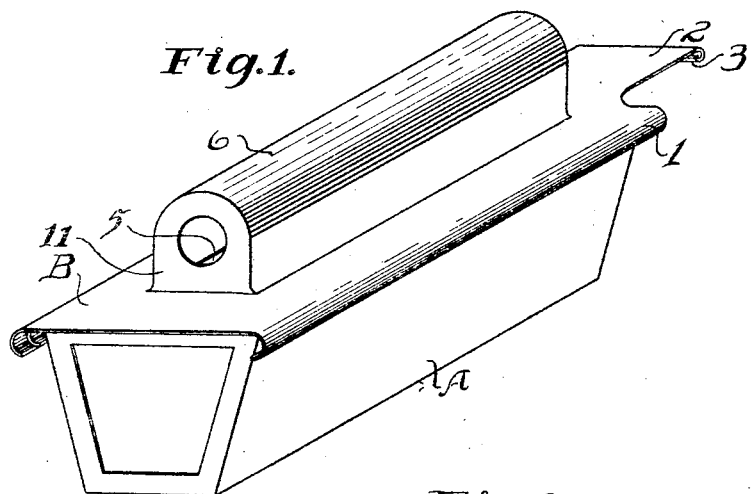
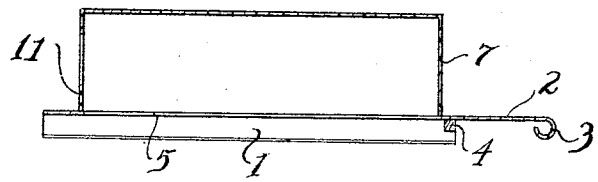
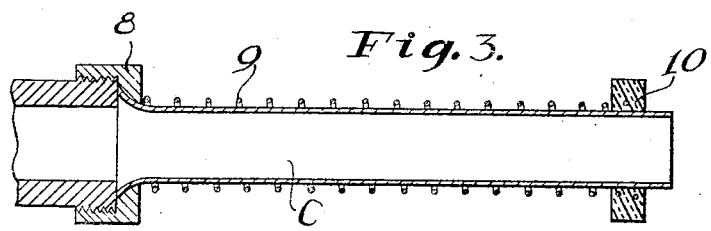
Inventor
Frank Bledig
by
Atty Patented July 21, 1925.

1,546,366

UNITED STATES PATENT OFFICE.

FRANK BLEDIG, OF ST. PAUL, MINNESOTA, ASSIGNOR OF ONE-HALF TO FLOYD S. KROHN, OF ST. PAUL, MINNESOTA.

MEAT-LOAF-PAN FILLER.

Application filed May 17, 1924. Serial No. 713,957.

*To all whom it may concern:*

Be it known that I, FRANK BLEDIG, a citizen of the United States, residing at St. Paul, in the county of Ramsey and State of Minnesota, have invented certain new and useful Improvements in Meat-Loaf-Pan Fillers, of which the following is a specification.

The present invention relates to an improved pan filling device.

In the making of meat and similar loaves, a baking pan is used made of ordinary tin. These pans were previously filled by hand, but owing to certain objectionable sanitary features connected with this method of filling pans, and also from a labor saving standpoint, it is desirable to fill such pans without having the food material come in contact with human hands.

A method to accomplish this consists in having a sheet metal cover for a baking dish with a hole in the center of said cover. Into this central hole may be inserted the nozzle of an ordinary meat stuffer such as is used in filling sausages. From this nozzle ground meat is extruded to fill the pan. An objectionable feature of this method of filling pans is that the natural grease that is in the meat is forced to the sides of the pan, while the central portion thereof is packed hard. In baking a loaf made in this way, the center swells up and is extremely dry and the sides thereof are greasy. Also, the loaf does not bake uniformly throughout and portions thereof frequently separate from the rest of the loaf when removing it from the pan, thereby necessitating that the loaf be reground and baked again.

An object of the present invention is to prepare a loaf for baking.

Another object is to fill a pan uniformly throughout its length with material for a loaf.

In order to attain these objects, there is provided in accordance with one feature of the invention, a cover to slidably engage a baking pan in a manner to cover the top opening thereof, an extension handle on one end by means of which the sliding cover may be gripped and either placed on the pan or removed therefrom, a positioning stop affixed to the under side of the sliding cover to assure the proper positioning of the cover, an elongated opening running longitudinally of the center of the cover over the baking pan, and a housing over said opening having an orifice in one end in which may be inserted the nozzle of a stuffing machine.

The stuffing machine used with this device is provided with a long nozzle of uniform diameter throughout. A coil spring loosely surrounds the stuffing nozzle and affixed to the end of the spring farthest from the stuffing machine is a washer which may be of rubber which engages the end of the housing on the sliding cover to prevent the escape of the material with which the pan is being filled.

These and other features of the invention will be more fully brought out in the following description and the accompanying drawings, wherein:

Figure 1, is a view in isometric projection of a common type of pan used in the making of meat loaves with a filler cover in position thereon.

Figure 2, is a view in longitudinal section of the filled cover; and

Figure 3, is a view in longitudinal section of a portion of a stuffing machine prepared for use with the filler cover shown in Figures 1 and 2.

Referring to the drawings in detail, and employing the same reference numbers for similar parts throughout the various views:

A baking pan A may be of an ordinary type, and a cover B therefor may be formed of sheet metal, the edges 1 thereof having been turned down to slidably engage the upper portion of the pan A. An extension 2 at one end of the cover is turned down as at 3 to afford a means for manually gripping the cover to slide it in position on a pan or to remove it therefrom. A stop 4 extends transversely across the under side of the cover B at a point to engage the end of the baking pan when the cover is in the proper position thereon for filling a pan. Longitudinally in the center of the cover B is an opening 5. Over this opening is a housing 6 extending over the entire length of said opening and having its rear end 7 completely closed and having its front end 11 closed except for a circular opening in the center thereof. This opening is of a size to receive a nozzle C which may be connected to an ordinary meat stuffer by means of a journaled ring 8. The nozzle C should be of a uniform diameter throughout its length. Loosely encircling the nozzle C is a coil spring 9 to which spring is fastened at one end a washer 10 which may be of rubber. This washer has a central opening of a size to receive the nozzle C and should not fit so tightly thereon as to prevent the washer from sliding back and forth on the nozzle.

The operation of the device is as follows: A filler cover B is slipped onto a baking pan A so that the turned down edges 1 thereof shall engage the top of the pan to hold the cover firmly thereon. When the cover reaches the proper position on the pan the stop 4, fastened to the under side of the cover, will stop the cover and hold it in such position. The nozzle of the meat stuffer is then inserted in the opening in the end 11 of the housing on the top of the pan cover, the washer 10 serving to seal the opening in which the nozzle is inserted and prevent the escape of any of the food material therethrough. The stuffer is then put in operation, forcing meat loaf material into the pan. As the pan becomes filled, the pressure of the meat loaf material, aided by the spring 9 forces the pan back filling the pan as it does so. When the pan is completely filled the discharge end of the nozzle will be just within the opening, and at this point the stuffer is stopped to prevent discharge of further meat loaf material. The pan is then removed and placed over a clean vessel in which excess meat may be contained and the cover removed from the pan by means of the handle 3. The housing 6 will, of course, be filled with meat loaf material and although in ordinary cases this material will remain in the housing, any of the meat loaf material which is loosened may be allowed to drop into the container mentioned. Meat loaf pans filled in this manner are found to bake perfectly and to conform to the highest standards of sanitation in food preparation.

What I claim is:

1. In combination with an extruding machine, a nozzle, a filler cover for baking pans, comprising a cover having an elongated opening therein, guide means to slidably retain the cover on a baking pan, a housing over the elongated opening having an aperture therein to receive the nozzle, and means to cause a relative movement between the pan and the nozzle during a discharge of material through the nozzle inserted in said aperture to uniformly fill the pan.

2. In combination with an extruding machine, a nozzle, a filler cover for a baking pan comprising a metal member having an elongated opening therein to cover a pan, a portion thereof bent down to slidably engage a pan, a handle connected to the metal member and extending beyond an end of the pan, a stop integral with the cover to position the cover on the pan, and a housing over the elongated opening in the metal member to receive the nozzle, and means to relatively move the pan and the nozzle inserted in the aperture in the housing while said nozzle is discharging material to uniformly fill a pan.

3. In combination with an extruding machine, a nozzle, a washer slidably surrounding the nozzle, a spring connected to the washer to resiliently position said washer, a cover to slidably engage a baking pan, said cover having an elongated opening therein, a housing over said elongated opening, and an aperture in the housing to receive the nozzle.

In testimony whereof I affix my signature.

FRANK BLEDIG.